(12) United States Patent
Mak

(10) Patent No.: US 9,652,141 B2
(45) Date of Patent: May 16, 2017

(54) PORTABLE ELECTRONIC DEVICE INCLUDING TOUCH-SENSITIVE DISPLAY AND METHOD OF CONTROLLING SAME

(75) Inventor: Genevieve Elizabeth Mak, Toronto (CA)

(73) Assignee: BlackBerry Limited, Waterloo (CA)

( * ) Notice: Subject to any disclaimer, the term of this patent is extended or adjusted under 35 U.S.C. 154(b) by 46 days.

(21) Appl. No.: 13/482,405

(22) Filed: May 29, 2012

(65) Prior Publication Data

US 2013/0321283 A1 Dec. 5, 2013

(51) Int. Cl.
*G06F 3/0488* (2013.01)
*G06F 3/01* (2006.01)
*G06F 15/00* (2006.01)
*G06F 3/041* (2006.01)

(52) U.S. Cl.
CPC .............. *G06F 3/0488* (2013.01); *G06F 3/01* (2013.01); *G06F 3/041* (2013.01); *G06F 15/00* (2013.01)

(58) Field of Classification Search
CPC ....................................... G06F 3/041
See application file for complete search history.

(56) References Cited

U.S. PATENT DOCUMENTS

| 2006/0132455 | A1* | 6/2006 | Rimas-Ribikauskas | G06F 3/0414 345/173 |
| 2009/0110288 | A1* | 4/2009 | Fujiwara | G06K 9/00463 382/190 |
| 2009/0228792 | A1* | 9/2009 | van Os | G06F 3/0488 715/702 |
| 2009/0228842 | A1 | 9/2009 | Westerman et al. | |
| 2010/0231529 | A1 | 9/2010 | Tikka | |
| 2010/0293460 | A1 | 11/2010 | Budelli | |
| 2011/0171617 | A1* | 7/2011 | Yeh | G06F 3/04886 434/157 |
| 2011/0239110 | A1* | 9/2011 | Garrett | G06F 3/0488 715/256 |
| 2012/0098860 | A1* | 4/2012 | Beale | G06F 3/0482 345/635 |
| 2012/0218205 | A1* | 8/2012 | Park | G06F 3/04883 345/173 |

FOREIGN PATENT DOCUMENTS

JP 2005322088 A 11/2005

OTHER PUBLICATIONS

European Patent Application No. 12169871.6, Extended European Search Report dated Aug. 30, 2012.
European Patent Application No. 12169871.6, Examination Report dated Jan. 2, 2014.
Canadian Patent Application No. 2,816,785, Office Action dated Jun. 12, 2014, 2 pages.
Examiner's Report dated Jun. 12, 2015, issued from the corresponding Canadian Patent Application No. 2,816,785.

* cited by examiner

*Primary Examiner* — Carolyn R Edwards
*Assistant Examiner* — Carl Adams
(74) *Attorney, Agent, or Firm* — Borden Ladner Gervais LLP; Geoffrey deKleine

(57) ABSTRACT

A method includes displaying a plurality of display elements on a touch-sensitive display of an electronic device; in response to detecting a touch lasting at least a first duration and associated with a first portion of the plurality of display elements, selecting the first portion; and in response to the touch lasting at least a second duration longer than the first duration, selecting a second portion of the plurality of display elements.

20 Claims, 11 Drawing Sheets

The quick brown fox jumps over the lazy dog. The quick brown fox jumps over the lazy dog.

The quick brown fox jumps over the lazy dog. The quick brown fox jumps over the lazy dog. The quick brown fox jumps over the lazy dog. The quick brown fox jumps over the lazy dog.

The quick brown fox jumps over the lazy dog. The quick brown fox jumps over the lazy

FIG. 6

The quick brown fox jumps over the lazy dog. The quick brown fox jumps over the lazy dog.

The quick brown fox jumps over the lazy dog. The quick brown fox jumps over the lazy dog. The quick brown fox jumps over the lazy dog. The quick brown fox jumps over the lazy dog.

The quick brown fox jumps over the lazy dog. The quick brown fox jumps over the lazy

FIG. 8

The quick brown fox jumps over the lazy dog. The quick brown fox jumps over the lazy dog.

The quick brown fox jumps over the lazy dog. The quick brown fox jumps over the lazy dog. The quick brown fox jumps over the lazy dog. The quick brown fox jumps over the lazy dog.

The quick brown fox jumps over the lazy dog. The quick brown fox jumps over the lazy

FIG. 9

PORTABLE ELECTRONIC DEVICE INCLUDING TOUCH-SENSITIVE DISPLAY AND METHOD OF CONTROLLING SAME

FIELD OF TECHNOLOGY

The present disclosure relates to electronic devices including but not limited to portable electronic devices having touch-sensitive displays and their control.

BACKGROUND

Electronic devices, including portable electronic devices, have gained widespread use and may provide a variety of functions including, for example, telephonic, electronic messaging and other personal information manager (PIM) application functions. Portable electronic devices include several types of devices including mobile stations such as simple cellular telephones, smart telephones (smart phones), Personal Digital Assistants (PDAs), tablet computers, and laptop computers, with wireless network communications or near-field communications connectivity such as Bluetooth® capabilities.

Portable electronic devices such as PDAs, or tablet computers are generally intended for handheld use and ease of portability. Smaller devices are generally desirable for portability. A touch-sensitive display, also known as a touch-screen display, is particularly useful on handheld devices, which are small and may have limited space for user input and output. The information displayed on the display may be modified depending on the functions and operations being performed.

Improvements in electronic devices with touch-sensitive displays are desirable.

BRIEF DESCRIPTION OF THE DRAWINGS

Embodiments of the present disclosure will now be described, by way of example only, with reference to the attached Figures, wherein:

FIG. 3 through FIG. 11 are front views illustrating examples of display element selection on an electronic device in accordance with the method of FIG. 2.

DETAILED DESCRIPTION

Figure 1:
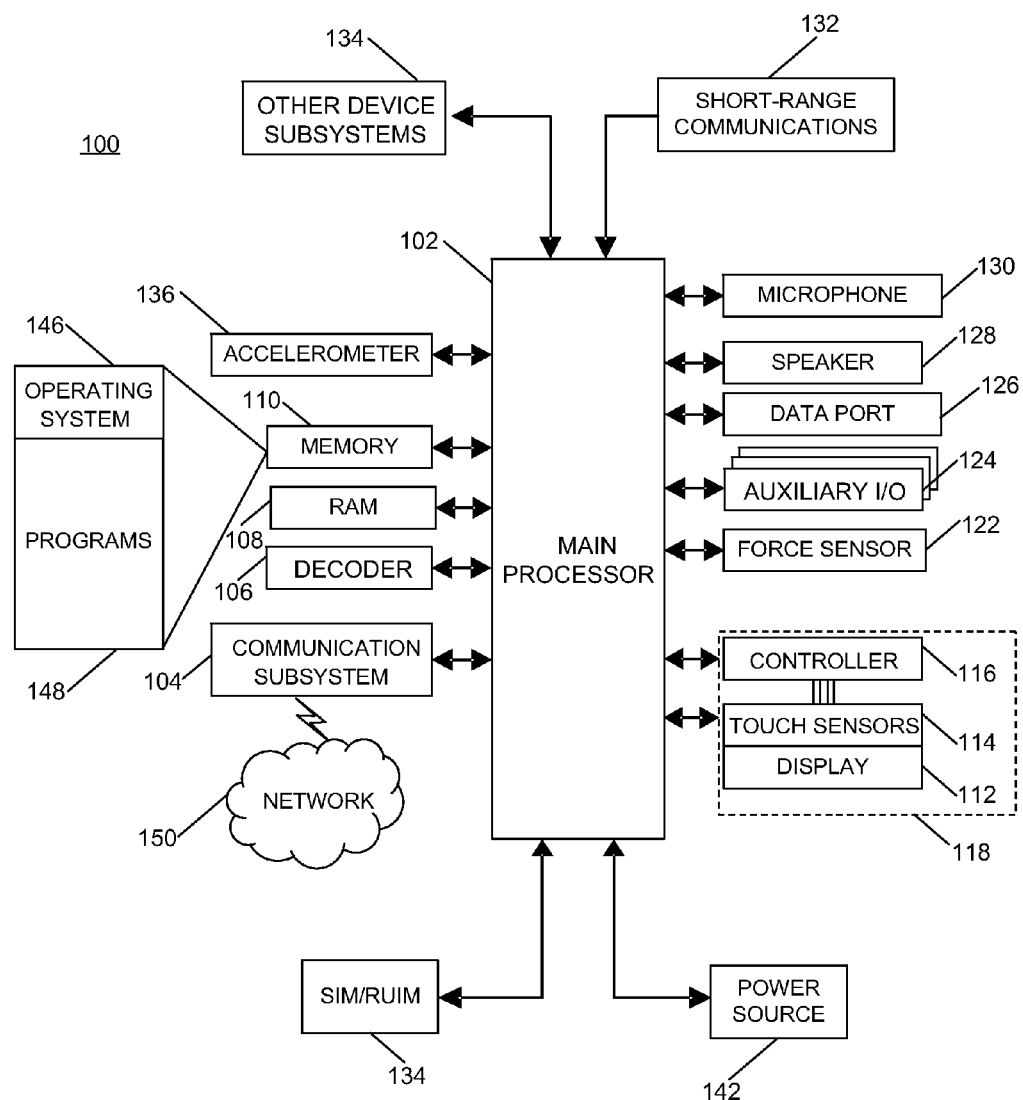
FIG. 1 is a block diagram of a portable electronic device in accordance with an example.

The following describes an electronic device and method including displaying a plurality of display elements on a touch-sensitive display of an electronic device; in response to detecting a touch lasting at least a first duration and associated with a first portion of the plurality of display elements, selecting the first portion; and in response to the touch lasting at least a second duration longer than the first duration, selecting a second portion of the plurality of display elements.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device, such as a portable electronic device as described herein. Examples of electronic devices include mobile, or handheld, wireless communication devices such as pagers, cellular phones, cellular smartphones, wireless organizers, personal digital assistants, wirelessly enabled notebook computers, tablet computers, mobile internet devices, electronic navigation devices, and so forth. The portable electronic device may also be a portable electronic device without wireless communication capabilities, such as a handheld electronic game device, digital photograph album, digital camera, media player, e-book reader, and so forth.

A block diagram of an example of a portable electronic device 100 is shown in FIG. 1. The electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as a Random Access Memory (RAM) 108, memory 110, a touch-sensitive display 118, an auxiliary input/output (I/O) subsystem 124, a data port 126, a speaker 128, a microphone 130, short-range communications 132 and other device subsystems 134. The touch-sensitive display 118 includes a display 112 and touch sensors 114 that are coupled to at least one controller 116 that is utilized to interact with the processor 102. Input via a graphical user interface is provided via the touch-sensitive display 118. Information, such as text, characters, symbols, images, icons, and other items that may be displayed or rendered on a portable electronic device, is displayed on the touch-sensitive display 118 via the processor 102. Optionally, the processor may interact with one or more force sensors 122. The processor 102 may also interact with an accelerometer 136 that may be utilized to detect direction of gravitational forces or gravity-induced reaction forces.

To identify a subscriber for network access, the portable electronic device 100 may utilize a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs, applications, or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth. A capacitive touch-sensitive display includes one or more capacitive touch sensors 114. The capacitive touch sensors may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. A touch may be detected from any suitable input member, such as a finger, thumb, appendage, or other objects, for example, a stylus, pen, or other pointer, depending on the nature of the touch-sensitive display 118. Multiple simultaneous touches may be detected.

One or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time.

Optional force sensors 122 may be disposed in conjunction with the touch-sensitive display 118 to determine or react to forces applied to the touch-sensitive display 118. The force sensors 122 may be force-sensitive resistors, strain gauges, piezoelectric or piezoresistive devices, pressure sensors, quantum tunneling composites, force-sensitive switches, or other suitable devices. Force as utilized throughout the specification, including the claims, refers to force measurements, estimates, and/or calculations, such as pressure, deformation, stress, strain, force density, force-area relationships, thrust, torque, and other effects that include force or related quantities. Optionally, force information associated with a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming.

Figure 2:
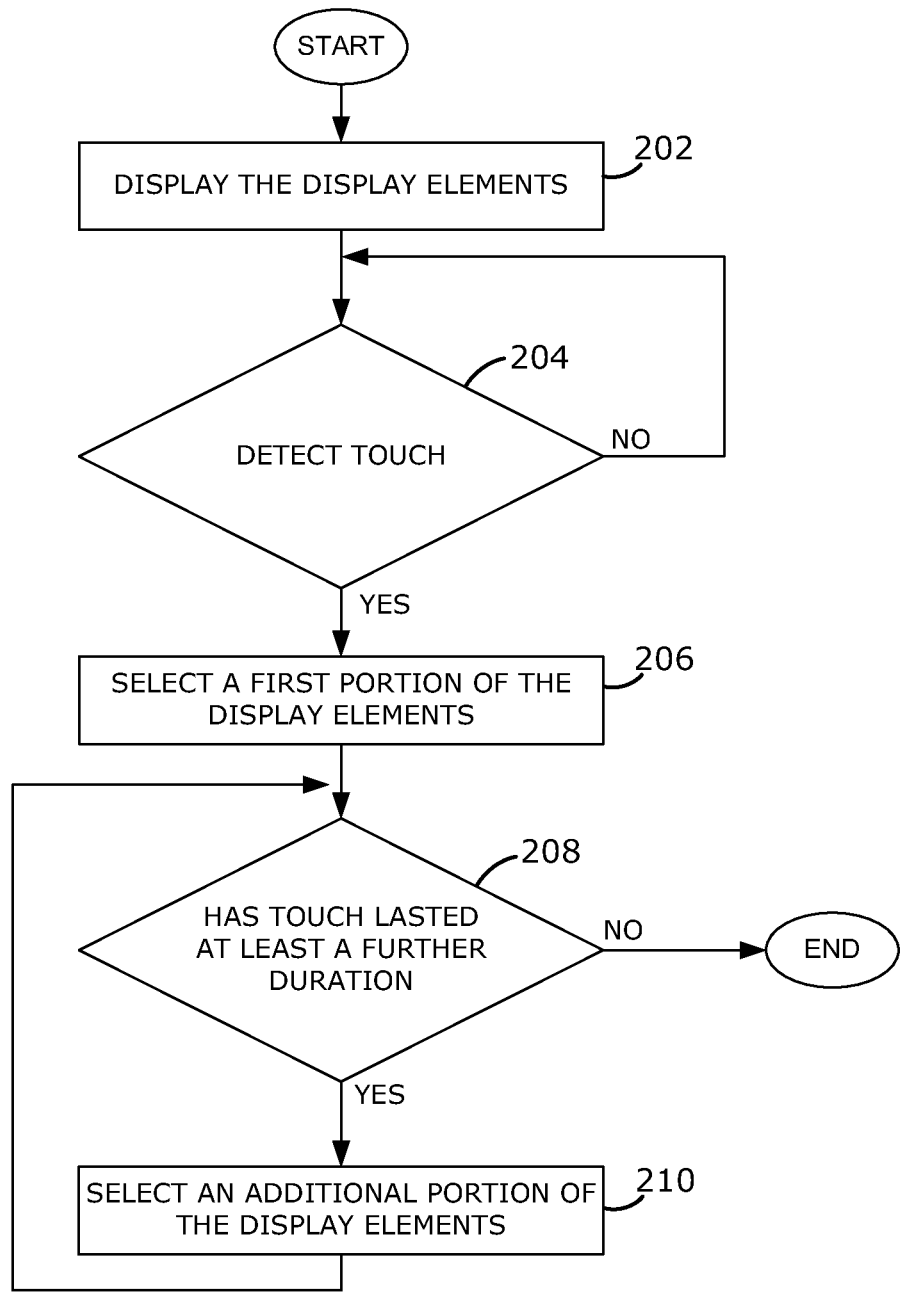
FIG. 2 is a flowchart illustrating an example of a method of display element selection on an electronic device.

A flowchart illustrating an example of a method of selecting display elements on a touch-sensitive display of an electronic device, such as the electronic device 100, is shown in FIG. 2. The method may be carried out by software executed by, for example, processor 102 and/or the controller 116. Coding of software for carrying out such a method is within the scope of a person of ordinary skill in the art given the present description. The method may contain additional or fewer processes than shown and/or described, and may be performed in a different order. Computer-readable code executable by at least one controller or processor of the portable electronic device to perform the method may be stored in a computer-readable medium, such as a non-transitory computer-readable medium.

A plurality of display elements are displayed on the touch-sensitive display 118 at 202. In various embodiments, the display elements can include but are not limited to one or more text elements, one or more media elements, one or more containing elements, or any combination thereof. The display elements may be displayed as part of a document, webpage, SMS message, e-mail, or any other document or file. The term text element can refer to, but is not limited to, one or more characters, symbols, words, strings of characters, phone numbers, emoticons, numbers, formulas, sentences, hyperlinks, or paragraphs. The term media element can refer to, but is not limited to, one or more graphic files, video files, or sound files or a link to one or more graphics, videos, sounds or any combination thereof. The term containing element refers to any display element that contains other display elements. For example, a containing element can include but, is not limited to, a table or an HyperText Markup Language (HTML) div element. An HTML div element can, for example, contain a text block and an image.

At 204, it is determined whether a gesture for selecting a display element has been detected. In some embodiments, the gesture for selecting a display element is a "touch and hold" gesture that lasts for at least a first duration of time. In various embodiments, the first duration of time is a predetermined duration of time. As used herein, the term "touch and hold" refers to a gesture in which the user touches the screen and maintains the touch for a duration of time. Accordingly, in some embodiments, 204 comprises detecting a touch and hold gesture that lasts for at least the first duration of time. In other embodiments, gestures other than the touch and hold gesture are used for selecting a display element.

If the relevant gesture has been detected, then the method continues to 206. If the relevant gesture has not been detected, then 204 is repeated.

At 206, a first portion of the plurality of display elements is selected. In various embodiments, the term first portion of display elements can refer to one or more display elements. In some embodiments, the first portion of the plurality elements is selected at least in part based on a location of the gesture detected at 204. For example, in some embodiments, when a touch and hold gesture is a applied over a particular display element, the portion of display elements selected includes at least that display element. In some embodiments, when a gesture is applied to one or more display elements, the gesture is said to be associated with the one or more display elements.

At 208, it is determined whether the gesture has lasted at least a further predetermined duration of time. If not, then the method ends and only the portion selected up to that point remains selected. If, on the other hand, it is determined that the gesture has lasted at least a further duration of time, then the method continues to 210. In some embodiments, the further duration of time is a predetermined duration of time.

At 210, an additional portion of the display elements is selected. In various embodiments, the additional portion can include any display elements. In some embodiments, the additional portion is selected to be adjacent to the previously selected portion. In some embodiments, the additional portion is selected to be on one side of the previously selected portion. In other embodiments, the additional portion is selected to be on multiple sides of the previously selected portion by selecting one or more display elements on at least two sides of the previously selected portion of display elements. After the additional portion of display elements is selected, 208 is repeated.

In some embodiments, each time 208 is executed, the further duration of time is substantially the same. This can be used to provide the effect of selecting additional portions of the display elements at a substantially uniform rate.

In other embodiments, each time 208 is executed, the further duration of time can be varied. In some embodiments, each further duration of time can be lessened. This can be used to provide the effect of selecting additional portions of the display elements at an increasing rate.

In some embodiments, the method of FIG. 2 has the effect of selecting an amount of display elements that depends on the duration that the gesture lasts. For example, if the user applies a touch and hold gesture and a first portion of display elements is selected and if the user maintains the gesture, then the total amount of display elements that are selected depends on how long the user maintains the gesture.

As mentioned above, in various embodiments, the gesture is a touch and hold gesture. The use of the touch and hold gesture along with the method of FIG. 2 allows the selection of variable amounts of display elements with a single hand. This is in contrast to known methods where a user is required to use both hands for operating the device. For example, in known methods, if a user would like to select a given amount of text, the user is generally required to either move tabs or slide their finger over the text that he or she would like to select. Accordingly, such known methods generally require a user to hold the device in one hand and pull the tabs or slide their finger across the text using their other hand. In contrast, the method of FIG. 2 allows the user to hold the device in one hand and use the same hand (for example, but not limited to, the thumb of the same hand) to apply the touch and hold gesture.

Figure 3:
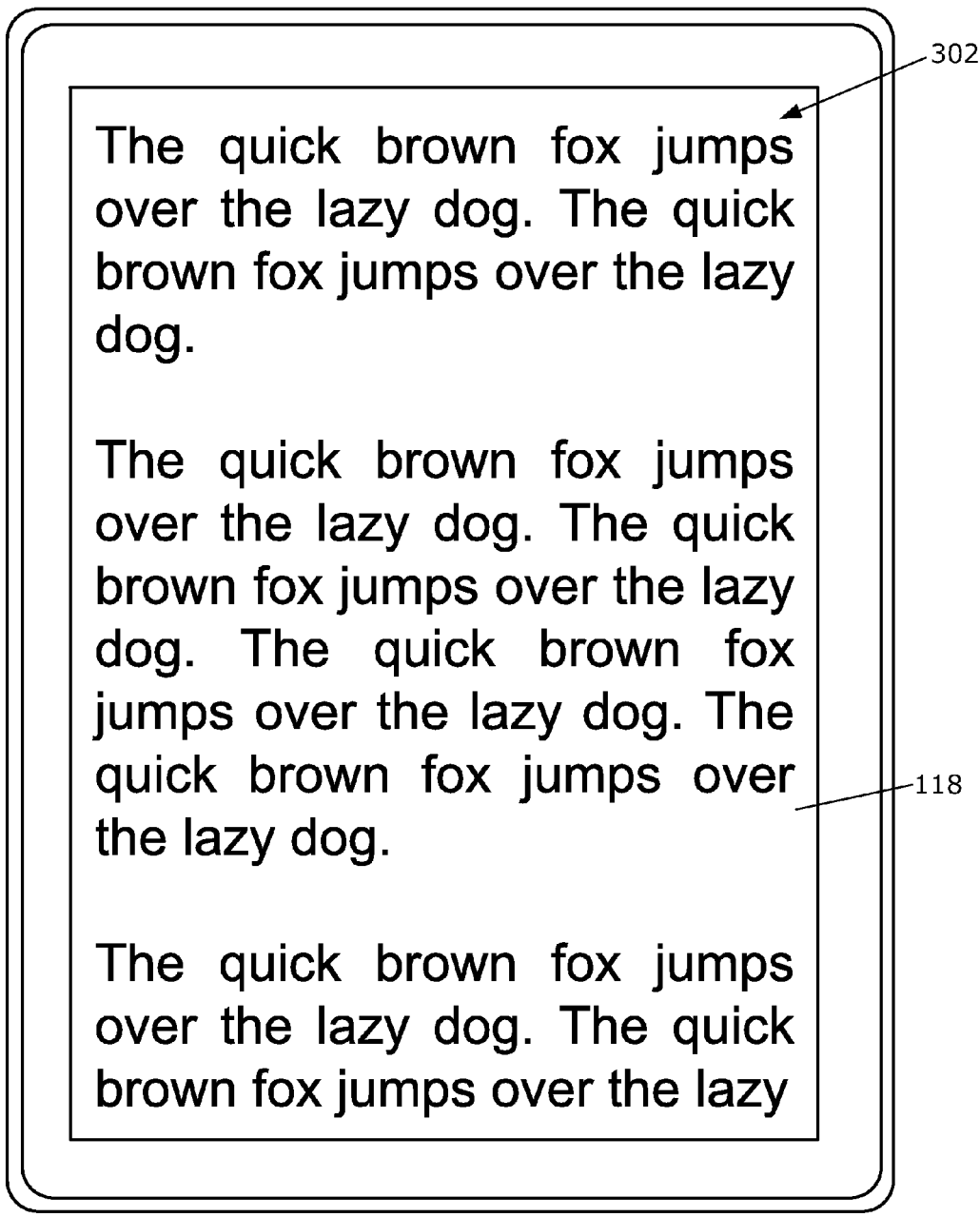

One example of selecting display elements on an electronic device 100 is illustrated in FIG. 3 through FIG. 7 and described with continued reference to FIG. 2. In the front view of FIG. 3, a plurality of display elements 302 are displayed on touch-sensitive display 118 at 202. Although FIG. 3 illustrates display elements that include only text, as mentioned above, display elements can include other elements in addition to or instead of text.

A touch and hold gesture is detected on display 118 at 204. In some embodiments, this includes determining that the touch and hold gesture lasts at least a first duration of time. In some embodiments, 204 also includes determining the touch contact location on the touch-sensitive display. In the example illustrated in FIG. 4, the gesture is a touch and hold gesture at the location illustrated by the circle 402.

Figure 4:
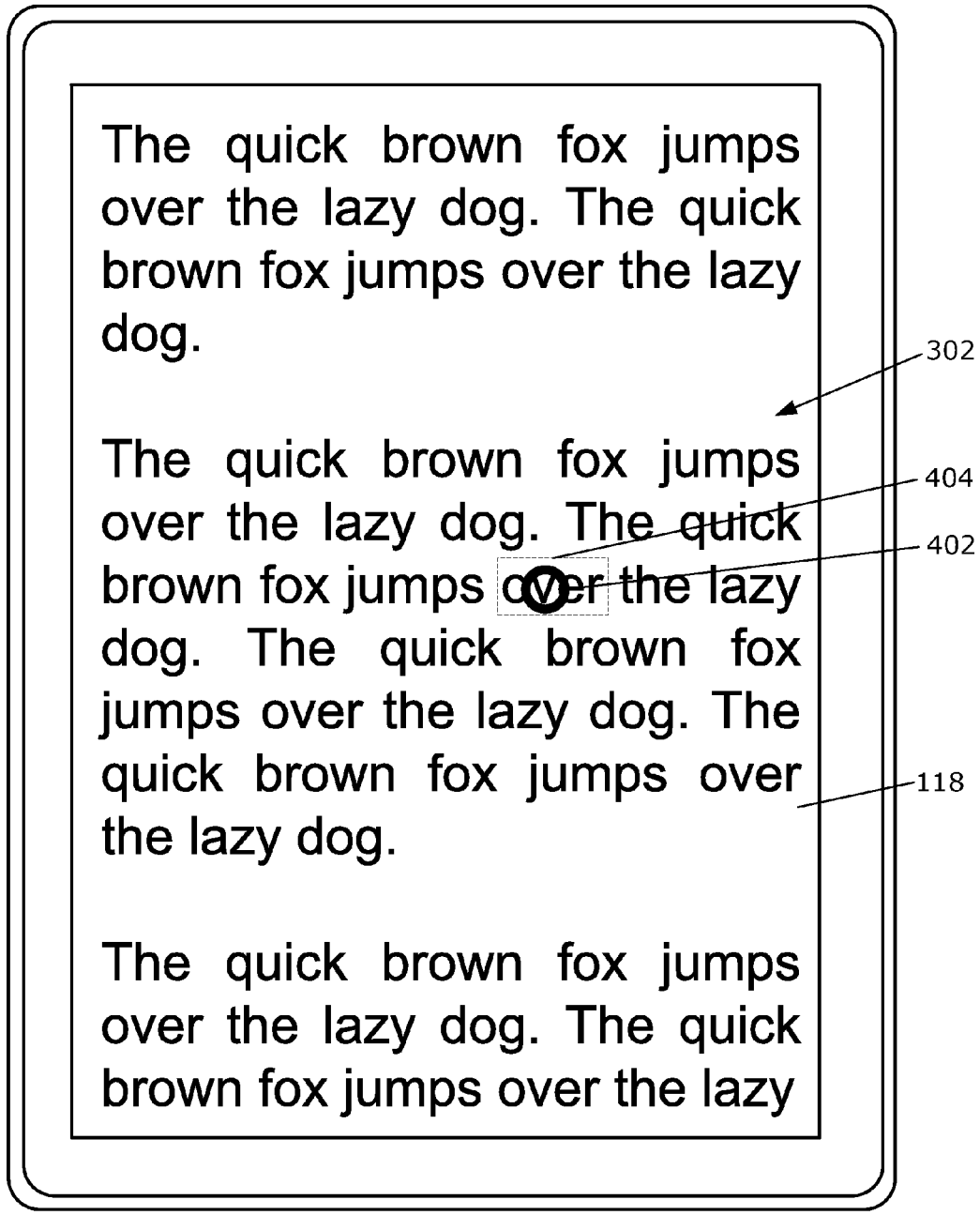

A first portion 404 of display elements 302 is selected at 206 based on the touch and hold gesture detected at 204. In some embodiments, when a display element is selected the display element is highlighted on display 118. In the example of FIG. 4, the touch occurs over the letter "v" in the word "over" and the entire word "over" is selected as the first portion. In other embodiments, the first portion of display elements is the letter "v" and therefore, the letter "v" would be selected. In other embodiments, the first portion of display elements can be the entire line that includes the same latter "v" or the entire sentence in which the letter "v" appears or the entire paragraph in which the letter "v" appears.

Figure 5:
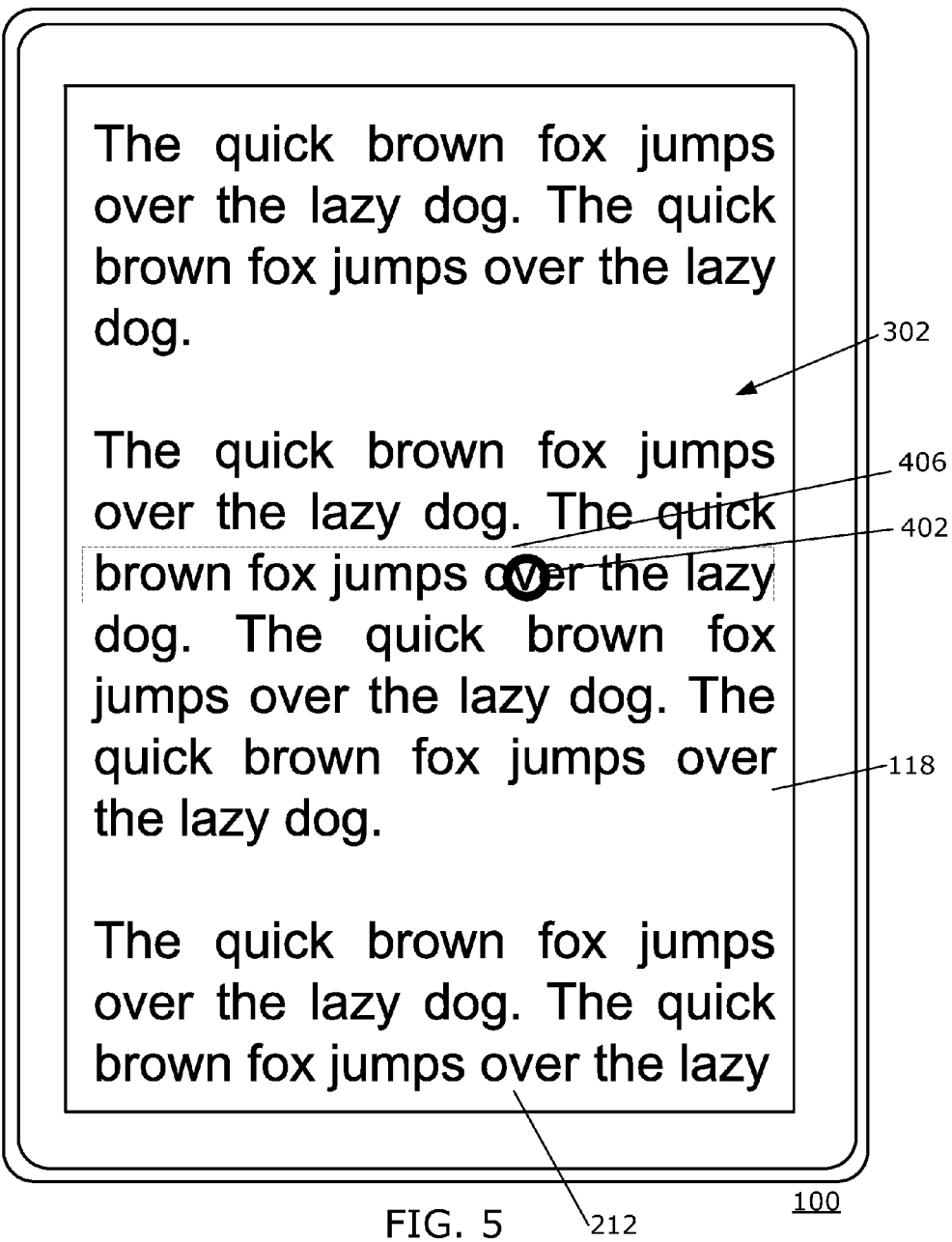

FIG. 5 illustrates a second portion 406 of display elements 302 selected in response to the gesture lasting a further duration. Second portion 406 includes first portion 402 plus an additional portion of display elements. The second portion 406 of display elements was selected by selecting an additional portion of elements at 210 in addition to the first portion based on a determination at 208 that the gesture has lasted at least a further duration. Second portion 406 includes the entire line of display elements to which the gesture is applied.

FIG. 6 illustrates a third portion 408 of display elements 302 selected in response to the gesture lasting yet a further duration. Third portion 408 includes second portion 406 plus an additional portion of display elements. The third portion 408 of display elements was selected by selecting an additional portion of elements at 210 in addition to the second portion based on a determination at 208 that the gesture has lasted a further duration. Third portion 408 includes the entire sentence that contains the display element to which the gesture is applied.

Figure 7:
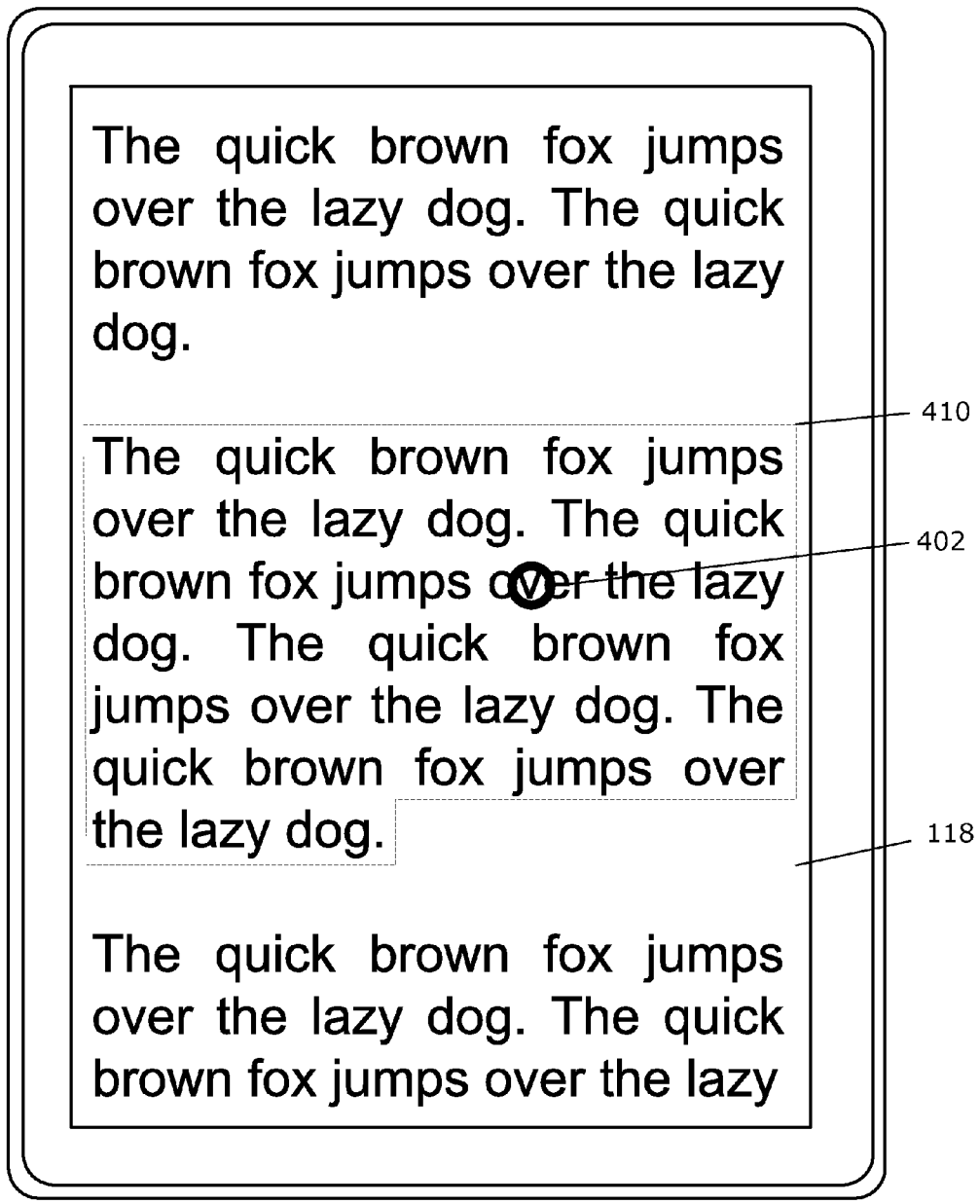

FIG. 7 illustrates a fourth portion 410 of display elements 302 selected in response to the gesture lasting yet a further duration. Fourth portion 410 includes third portion 408 plus an additional portion of display elements. The fourth portion 410 of display elements was selected by selecting an additional portion of elements at 210 in addition to the second portion based on a determination at 208 that the gesture has lasted a further duration. Fourth portion 410 includes the entire paragraph of display elements to which the gesture is applied. Although FIG. 7 illustrates a paragraph, it should be understood that any block of display elements could be selected instead. For example, in the case of text, in various embodiments, a block of text is selected even if it does not form a proper paragraph. For example, the block of text may include strings of characters that are not proper words or it may include symbols that are not alphanumeric characters, or it may not include proper punctuation. As used herein, the term block of display elements refers to any block of display elements including but not limited to a paragraph.

Although not illustrated, the selection of display elements can continue indefinitely. For example, in the example FIGS. 4 to 7 assume that the display elements constitute a text document. The user can continue to apply the gesture and thereby increase the selection of display elements beyond what is illustrated in FIG. 7 until the entire text document is selected. The selection can progress in any suitable manner. For example, in some embodiments, after the first paragraph is selected, the next selection includes all the display elements currently displayed on display 118. In other embodiments, the next selection after the selection of the first paragraph includes all the display elements of whatever file or document is currently being displayed on display 118. For example, if a text document is displayed, then all the display elements in the entire text document is selected regardless of whether all of the display elements are currently displayed on display 118. It should be understood that the reference to a text document is used as an example only. The embodiments described herein are equally applicable to e-mail messages, webpages, SMS messages, and any other document or file, or any other rendering of display elements on display 118.

In other embodiments, the selection of display elements progresses by selecting the block of display elements above or below the first selected block. In other embodiments, the selection of display elements progresses by selecting the block of display elements above and below the first selected block.

In some embodiments, as the selection progresses to include items that are not displayed on display 118, the magnification level is adjusted to accommodate the selected items on display 118. In other embodiments, as the selection progresses, the display is scrolled to accommodate at least some of the newly selected items on display 118. In other embodiments, the display is not adjusted and display elements that are not displayed on display 118 are selected despite not being displayed on display 118. In other words, in some embodiments, a display element need not be displayed on display 118 in order to be selected.

In the example of FIGS. 4 to 7, first a word is selected, then a line, then a sentence, then a paragraph. In some embodiments, the shorter of the sentence and the line including the word associated with the gesture is selected. For example, if the sentence is shorter than the line, then the sentence is selected before the line is selected. Similarly, if the line is shorter than the sentence, then the line is selected before the sentence.

In other embodiments, first a word is selected then a line, then a paragraph such that a sentence is not selected unless it constitutes an entire line. In yet other embodiments, first a word is selected then a sentence, then the paragraph such that a line is not selected unless the selected sentence constitutes an entire line.

In other embodiments, instead of a word being selected first, a single character is selected. Accordingly, in the example of FIG. 4, as the touch is applied over the letter "v" in the word "over", in some embodiments, the letter "v" would first be selected instead of the entire word "over". In some embodiments, whether a single character is selected or an entire word is selected depends on one or more parameters, such as for example, but not limited to, user preferences or the magnification level. For example, in some embodiments if the magnification level is beyond a threshold magnification level, then a character is selected and if the magnification level is below the threshold magnification level, then a word is selected. Similar thresholds can be used to cause an entire sentence, line, paragraph, or other grouping of display elements to be first selected. Thresholds can be applied in a similar manner to container elements. For example, portions of a cell of a table may be selected when the magnification is within a certain range, while at other ranges of magnification an entire cell, row, column or table may be selected first.

Figure 10:
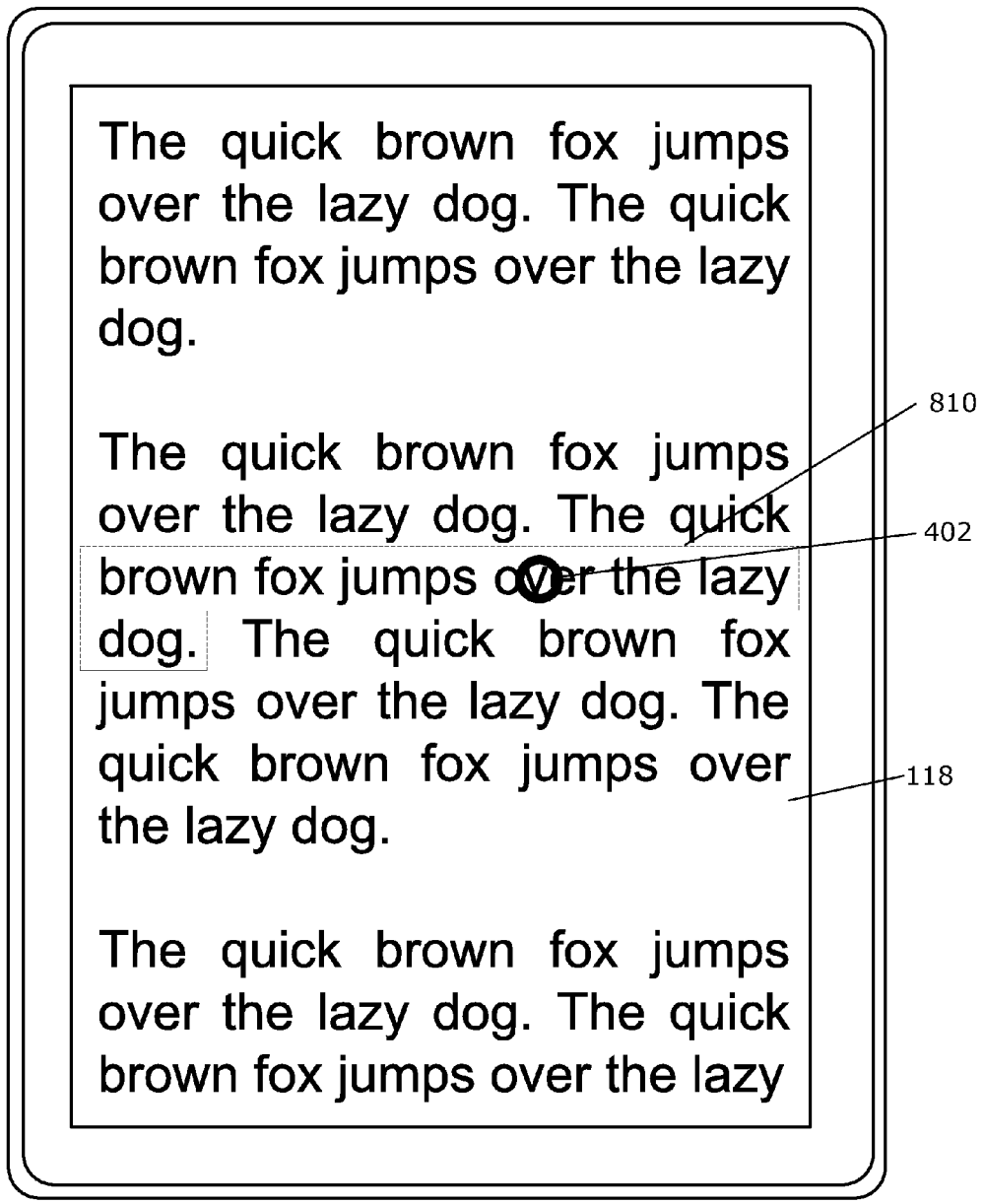

A second example of selecting display elements on an electronic device 100 is illustrated in FIGS. 3, 4 and 8 through 11. The second example begins in the same manner as the first example. In the second example, after the selection of the word "over", if the gesture continues to last for a further duration, then a second portion 806 of the display elements is selected. The second portion 806 includes the first portion 404 and the two words on either side of the first portion 404. As can be seen in FIGS. 9 and 10 in this second example, the selection progresses each time by adding one word to the previous selection. Accordingly, third selected portion 808 includes second selected portion 806 and one word on either side of second portion 806. Similarly, fourth selected portion 810 includes third selected portion 808 and one word on either side of third selected portion 808.

Figure 11:
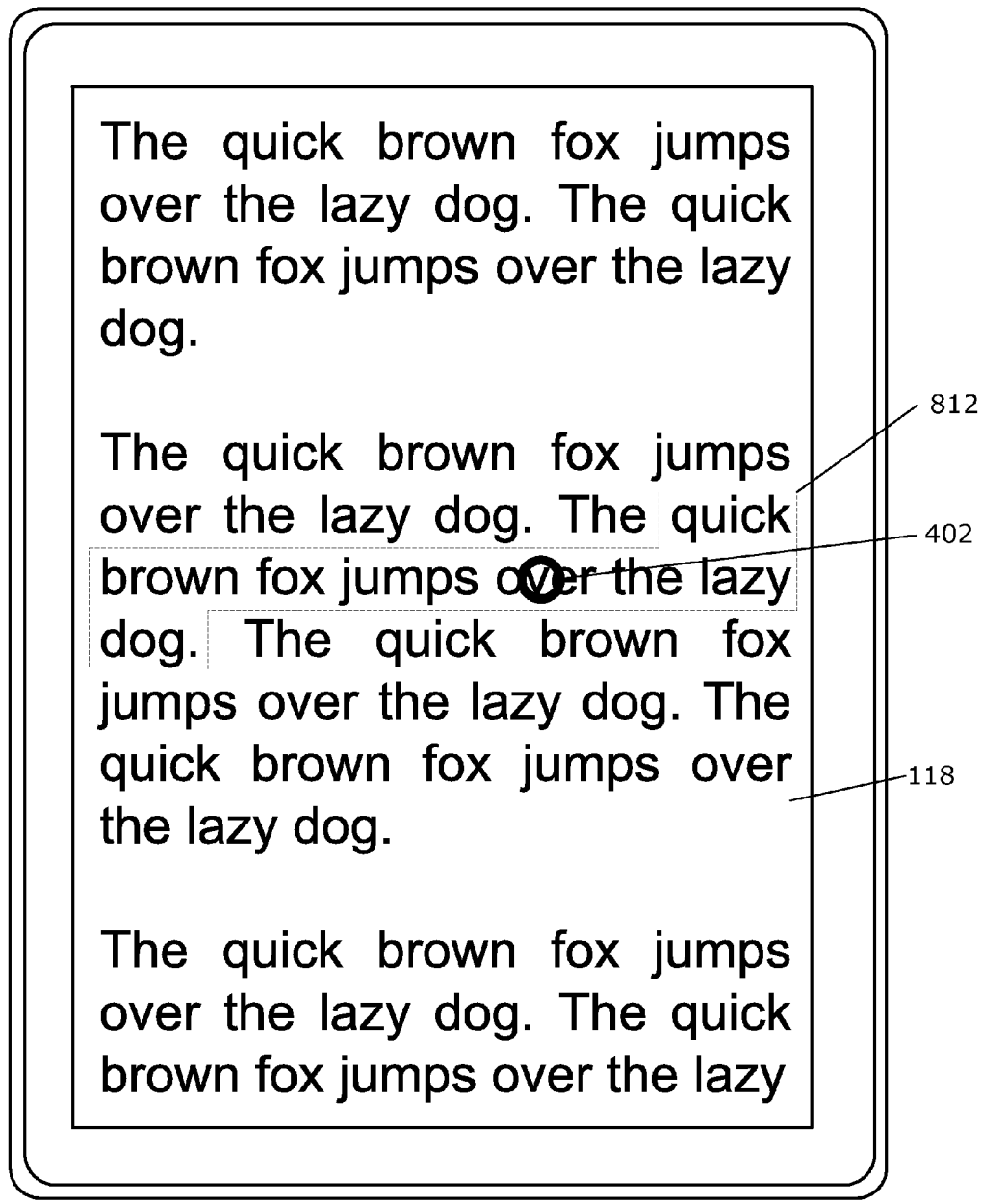

In this second example, if the selection of words progresses such that both ends of a sentence are not reached at the same time, then the selection in the direction that reaches an end of the sentence first stops until the other end of the sentence is reached. For example, in FIG. 10 one end of the sentence has been reached while the other end has not. Specifically, the selection has progressed to include the word "dog" at the end of the sentence but has not progressed to include the word "The" at the other end (i.e. the beginning) of the sentence. Therefore, as illustrated in FIG. 11, after one end of the sentence is reached, the selection only progresses towards the unselected end of the sentence. As can be seen in FIG. 11, the only word added to the fourth selected portion 810 of selected display elements to generate the fifth portion 812 of selected display elements is the word "quick". The fifth selected portion 812 does not include any words on the other side of the fourth selected portion 810. In some embodiments, a similar result occurs when one end of a line, or paragraph or a block is reached. This allows, for example, an entire sentence or an entire paragraph (or any other grouping of display elements) to be selected before the selection moves on to a new sentence or a new paragraph.

In other embodiments, the selection continues to progress in both directions regardless of whether one direction reaches an end of the sentence (or other grouping of display elements) before the other direction. In FIGS. 10 and 11, the period at the end of the sentence is shown as being selected in addition to the word "dog". In other embodiments, the period is not selected.

It should be understood that the selection can progress in any suitable manner. In the example illustrated in FIGS. 3, 4 and 8 through 11 the selection is shown to progress one word at a time on either side of the previous selection. In other embodiments, the selection can progress one character at a time. In addition, the example illustrated in FIGS. 3, 4 and 8 through 11 shows the selection progressing in two directions. In other embodiments, the selection progresses in only one direction. In some embodiments, the number of directions in which the selection progresses depends on the location at which the gesture is applied. For example, in some embodiments, if the user applies a gesture to a display element at one end of a grouping (e.g., sentence, paragraph, line, block, etc.) of display elements, then the selection progresses in one direction towards the opposite end of the grouping. For example, in some embodiments, the user can apply a gesture to the first character or the first word of a paragraph and the selection will progress towards the other end of the paragraph.

As a further example, consider a containing element displayed on display 118, where the containing element is a HTML div element containing a text block and an image. In some embodiments, if the user applies a gesture (e.g. a touch and hold) to select a character in the text block, then the selection progresses in the following manner, where each subsequent selection occurs if the gesture lasts for a further duration: (1) the word that includes the character to which the gesture is applied; (2) the sentence that includes the word; (3) the text block; (4) the text block and the image; and (5) the entire div. The div can include formatting and a border. In some embodiments, the selection of the div includes the selection of the formatting and the boarder. In various embodiments, after the selection has been made the user is then able copy and paste (or otherwise make use of)

the selected portion in another location. For example, if the user selected the entire div, then in some embodiments when the user copies and then pastes the div, the div will be pasted with the formatting and the border. It should be understood that the selection progression discussed in this paragraph is an example and that, in other embodiments, the selection progresses in a different manner.

As yet another example, consider a containing block that is a table. Each cell of the table can, but is not required to, contain a display element. In some embodiments, if the user applies a touch and hold to a cell of the table, then the selection progresses in the following manner: (1) the cell; (2) the row in which the cell is situated; (3) a group of rows including the row that was previously selected; (4) the entire table, including all of the formatting. It should be understood that the selection progression discussed in this paragraph is an example and that, in other embodiments, the selection progresses in a different manner. For example, in some other embodiments, instead of selecting the row that includes the cell to which the gesture is applied, the column that includes the cell is selected instead. In addition, in some embodiments, applying touch and hold to a character in a cell does not immediately select the cell but rather selects the character first and may then progress to select the cell. In general, in various embodiments, individual display items can be selected when they are part of a containing element.

It should be understood that the selection of display elements described above can be performed for a variety of reasons and that the selected display elements can be used in a variety of ways. For example, selected display elements can be cut, copied, pasted, saved (e.g. save a selected image or other file), forwarded (a selected display element, such as an image, can be forwarded to a social media site), used to populate fields (e.g. contact fields in a contact database), or used as part of a function or operation. For example, in the case of a phone number, selection of the phone number can be used to dial the number. Similarly, selection of an email address can be used to generate a email message addressed to that email address.

The method is not limited to the portable electronic device illustrated in the examples. The method may be applied utilizing other electronic devices. The method may also be applied to display elements displayed in any orientation. The examples illustrate a portrait orientation but other orientation such as the landscape orientations are also applicable.

A method includes displaying a plurality of display elements on a touch-sensitive display of an electronic device; in response to detecting a touch lasting at least a first duration and associated with a first portion of the plurality of display elements, selecting the first portion; and in response to the touch lasting at least a second duration longer than the first duration, selecting a second portion of the plurality of display elements.

An electronic device includes a touch-sensitive display and at least one processor coupled the touch-sensitive display and configured to: display a plurality of display elements on a touch-sensitive display of an electronic device; in response to detecting a touch lasting at least a first duration and associated with a first portion of the plurality of display elements, select the first portion; and in response to the touch lasting at least a second duration longer than the first duration, select a second portion of the display elements.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A method of selecting display elements, the method comprising:
    displaying a plurality of display elements on a touch-sensitive display of an electronic device;
    in response to detecting a touch and hold gesture maintained at a location on the touch-sensitive display, for at least a first duration and associated with a first portion of the plurality of display elements, selecting the first portion, wherein the first portion that is selected is dependent on a magnification level of the display elements displayed on the touch-sensitive display such that the first portion includes more of the display elements when the magnification level is below a threshold magnification level compared to the display elements included in the first portion when the magnification level is above the threshold magnification level; and
    in response to detecting that the touch and hold gesture is maintained at the location on the touch-sensitive display for at least a second duration longer than the first duration, incrementally selecting additional display elements in both a first direction away from the location at which touch and hold gesture is maintained to select display elements displayed following the first portion in order on the touch-sensitive display, and a second direction away from the location at which touch and hold gesture is maintained during a duration of the touch and hold gesture to select display elements displayed preceding the first portion in the order;
    in response to detecting that the touch and hold gesture maintained at the location on the touch-sensitive display, continuing to incrementally select additional display elements in both the first direction away from the location at which touch and hold gesture is maintained to select display elements displayed following the first portion in order on the touch-sensitive display, and the second direction away from the location at which touch and hold gesture is maintained to select display elements displayed preceding the first portion in the order during the duration of the touch and hold; and
    if a first end of a grouping of display elements is reached in the first direction before a second end of the grouping of display elements is reached in the second direction, continuing to select additional display elements only in the second direction until the first of the second end is reached or the touch and hold gesture is released.

2. The method of claim 1, wherein the display elements comprise entries of a table.

3. The method of claim 1, wherein the first portion comprises a cell of the table.

4. The method of claim 1, wherein the display elements comprise characters and the first portion comprises a word.

5. The method of claim 4, wherein the grouping comprises a line of text including the word.

6. The method of claim 4, wherein the grouping comprises a sentence including the word.

7. The method of claim 4, the grouping comprises a paragraph including the word.

8. The method of claim 3, wherein the grouping comprises a row of the table.

9. The method of claim 3, wherein the grouping comprises a column of the table.

10. The method of claim 1, wherein the display elements comprise media elements.

11. A non-transitory computer-readable medium having computer-readable code executable by at least one processor of a portable electronic device to perform the method according to claim 1.

12. An electronic device comprising:
a touch sensitive display; and
at least one processor coupled to the touch-sensitive display and configured to:
    display a plurality of display elements on the touch-sensitive display;
    in response to detecting a touch and hold gesture maintained at a location on the touch-sensitive display, for at least a first duration and associated with a first portion of the plurality of display elements, select the first portion, wherein the first portion that is selected is dependent on a magnification level of the display elements displayed on the touch-sensitive display such that the first portion includes more of the display elements when the magnification level is below a threshold magnification level compared to the display elements included in the first portion when the magnification level is above the threshold magnification level; and
    in response to detecting that the touch and hold gesture is maintained at the location on the touch-sensitive display for at least a second duration longer than the first duration, incrementally select additional display elements in both a first direction away from the location at which touch and hold gesture is maintained to select display elements displayed following the first portion in order on the touch-sensitive display, and a second direction away from the location at which touch and hold gesture is maintained during a duration of the touch and hold gesture to select display elements displayed preceding the first portion in the order;
    in response to detecting that the touch and hold gesture maintained at the location on the touch-sensitive display, continue to incrementally select additional display elements in both the first direction away from the location at which touch and hold gesture is maintained to select display elements displayed following the first portion in order on the touch-sensitive display, and the second direction away from the location at which touch and hold gesture is maintained to select display elements displayed preceding the first portion in the order during the duration of the touch and hold; and
    when a first end of a grouping of display elements is reached in the first direction before a second end of the grouping of display elements is reached in the second direction, continuing to select additional display elements only in the second direction until the first of the second end is reached or the touch and hold gesture is released.

13. The electronic device of claim 12, wherein the display elements comprise entries of a table.

14. The electronic device of claim 12, wherein the first portion comprises a cell of the table.

15. The electronic device of claim 12, wherein the display elements comprise characters and the first portion comprises a word.

16. The electronic device of claim 15, wherein the grouping comprises a line of text including the word.

17. The electronic device of claim 15, wherein the grouping comprises a sentence including the word.

18. The electronic device of claim 15, wherein the grouping comprises a paragraph including the word.

19. The electronic device of claim 15, wherein the grouping comprises one of a row or a column of the table.

20. The electronic device of claim 12, wherein the display elements comprise media elements.

* * * * *